(12) United States Patent
Howard

(10) Patent No.: US 9,212,686 B2
(45) Date of Patent: Dec. 15, 2015

(54) PREVAILING TORQUE NUT

(71) Applicant: ACTEURO LIMITED, Nottinghamshire (GB)

(72) Inventor: Peter Howard, Taren Point (AU)

(73) Assignee: ACTEURO LIMITED, Nottinghamshire (GB)

( * ) Notice: Subject to any disclaimer, the term of this patent is extended or adjusted under 35 U.S.C. 154(b) by 0 days.

(21) Appl. No.: 14/385,584

(22) PCT Filed: Mar. 11, 2013

(86) PCT No.: PCT/AU2013/000238
§ 371 (c)(1),
(2) Date: Sep. 16, 2014

(87) PCT Pub. No.: WO2013/134817
PCT Pub. Date: Sep. 19, 2013

(65) Prior Publication Data
US 2015/0043991 A1   Feb. 12, 2015

(30) Foreign Application Priority Data
Mar. 16, 2012   (AU) ................................ 2012901082

(51) Int. Cl.
| F16B 39/28 | (2006.01) |
| F16B 39/30 | (2006.01) |
| F16B 37/00 | (2006.01) |
| B23G 1/02  | (2006.01) |
| B23G 9/00  | (2006.01) |

(52) U.S. Cl.
CPC . *F16B 39/30* (2013.01); *B23G 1/02* (2013.01); *B23G 9/005* (2013.01); *F16B 37/00* (2013.01); *B23G 2210/04* (2013.01)

(58) Field of Classification Search
CPC ............................. F16B 39/28; F16B 39/282
USPC ............. 411/277, 279, 436, 917, 937, 937.1, 411/938; 29/DIG. 26; 470/18, 19, 25
See application file for complete search history.

(56) References Cited

U.S. PATENT DOCUMENTS 2,255,384 A * 9/1941 Hood ............................ 411/277
2,333,290 A * 11/1943 Brackett ...................... 411/277
2,337,030 A * 12/1943 Cole ............................ 411/308

(Continued)

FOREIGN PATENT DOCUMENTS

| GB | 875416   | 8/1961 |
| GB | 2041135  | 9/1980 |

OTHER PUBLICATIONS

International Search Report and the Written Opinion of the International Searching Authority, PCT/AU2013/000238, filed Mar. 11, 2013, Australian Patent Office, May 2013,9 pages.

(Continued)

*Primary Examiner* — Roberta Delisle

(57) ABSTRACT

Disclosed herein is a prevailing torque nut (10) comprising a body (12) having a longitudinal opening (14) extending therethrough. The body has a hexagonal outer surface (16) and an inner surface (18) defining the opening (14). A female thread (20) is formed on the inner surface and extends from one longitudinal end to an opposite longitudinal end of the opening (14). The thread (20) has a constant depth along its entire length, is of helical configuration along its entire length, and tapers radially inwardly in diameter at one end of the opening (14).

17 Claims, 2 Drawing Sheets

(56) References Cited

U.S. PATENT DOCUMENTS

Figure 1:
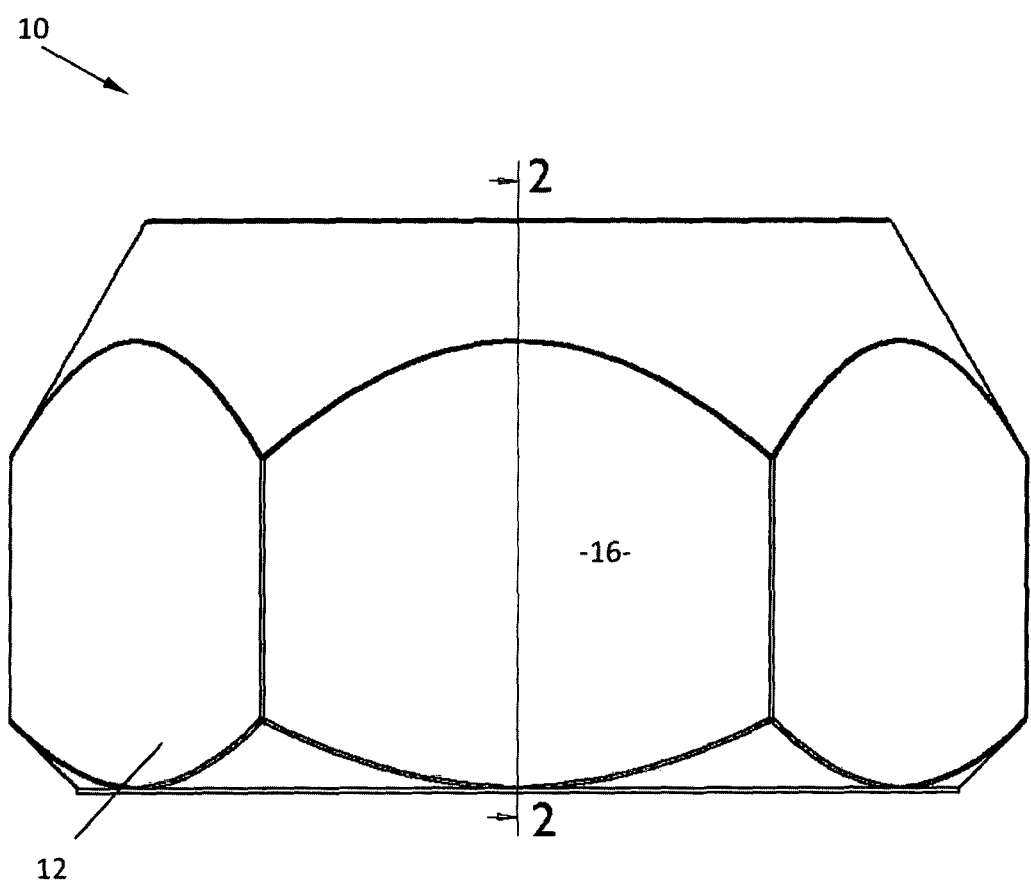

| | | | |
|---|---|---|---|
| 2,388,467 A | | 11/1945 | EJ Cole |
| 2,776,692 A | * | 1/1957 | Granberry ............... 411/283 |
| 2,897,867 A | | 8/1959 | La Torre |
| 2,923,339 A | * | 2/1960 | Skidmore ............... 411/277 |
| 3,198,230 A | * | 8/1965 | Stover, III ............... 411/282 |
| 3,208,494 A | * | 9/1965 | Skidmore ............... 411/283 |
| 3,340,920 A | * | 9/1967 | Johnson ............... 411/282 |
| 3,354,926 A | * | 11/1967 | Mattick ............... 411/282 |
| 3,412,772 A | * | 11/1968 | Meyfarth et al. ............... 411/282 |
| 3,431,959 A | * | 3/1969 | Beebe et al. ............... 411/282 |
| 3,496,582 A | * | 2/1970 | Johnson ............... 470/19 |
| 4,381,163 A | | 4/1983 | Witte et al. |
| 5,791,997 A | * | 8/1998 | Barney et al. ............... 470/18 |
| 5,827,027 A | * | 10/1998 | Wakabayashi ............... 411/283 |
| 6,364,588 B1 | * | 4/2002 | Fujii et al. ............... 411/277 |
| 6,386,808 B2 | * | 5/2002 | Fujii et al. ............... 411/277 |

OTHER PUBLICATIONS

European extended Search Report, EP Application No. 13761799.9, European Patent Office, dated Sep. 16, 2015, 5 pages.

* cited by examiner

PREVAILING TORQUE NUT

The present application claims priority from Australian Provisional Patent Application No 2012901082 filed on 16 Mar. 2012, the content of which is incorporated herein by reference.

The present disclosure relates to a prevailing torque nut.

A prevailing torque nut is a type of lock nut that provides a prevailing torque to resist self-loosening. There are two main categories of prevailing torque nuts: all metal; and nylon insert.

All metal prevailing torque nuts typically gain a prevailing torque by distorting the threads at the top of the nut by some means. Conventionally, the threads are distorted by tapering the thickness of the nut at one end and radially inwardly punching this thinner end of the nut at three equally circumferentially spaced apart locations. However, the degree of deformation resulting from the punching is difficult to control and often results in the nut thread becoming overly distorted, which can prevent the nut thread from properly mating with the thread of an associated bolt and make the nut impossible to remove by screwing. Also, the nut has to be accurate in height, otherwise the punching operation is inconsistent and results in a wide variance in prevailing torque. However, achieving an accurate nut height is expensive and requires precision engineering to provide reliability and consistency. Another disadvantage with this type of conventional nut is that the thread in the distorted section exhibits point contact when engaged with the male thread of an associated bolt. Accordingly, the desired prevailing torque can be difficult to reliably achieve. A further disadvantage with this type of conventional nut is that the punching operation distorts the outer shape of the nut and can make the nut more difficult to engage with nut removal tools, such as spanners, which hinders nut removal.

Nylon insert torque prevailing nuts utilise a nylon, or other polymer, insert to achieve a prevailing torque. However, these inserts increase the manufacturing cost of the nut and can only provide a limited prevailing torque.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The present disclosure provides a prevailing torque nut comprising:
  a body having a longitudinal opening extending at least partially therethrough, the body having an outer surface and an inner surface defining the opening; and
  a female thread formed on the inner surface and extending from one longitudinal end toward an opposite longitudinal end of the opening, the thread:
    having a constant depth along its entire length,
    being of helical configuration along its entire length, and
    tapering radially inwardly in diameter at one end of the opening.

The thread may be formed by machining, such as with a computer numerically controlled (CNC) lathe.

The radial tapering of the thread may be designed to produce a predetermined prevailing torque when a bolt is engaged with the nut.

The distance between the outer and inner surfaces of the nut may be constant along the entire length of the opening. Alternatively, the distance between the outer and inner surfaces of the nut may reduce in that portion of the nut in which the thread is tapered.

The nut may be a hex nut.

In a second aspect, there is provided a method of manufacturing a prevailing torque nut, said method comprising forming the nut with:
  a body having a longitudinal opening extending at least partially therethrough, the body having an outer surface and an inner surface defining the opening; and
  a female thread formed on the inner surface and extending from one longitudinal end toward an opposite longitudinal end of the opening, the thread:
    having a constant depth along its entire length,
    being of helical configuration along its entire length, and
    tapering radially inwardly in diameter at one end of the opening.

Figure 2:
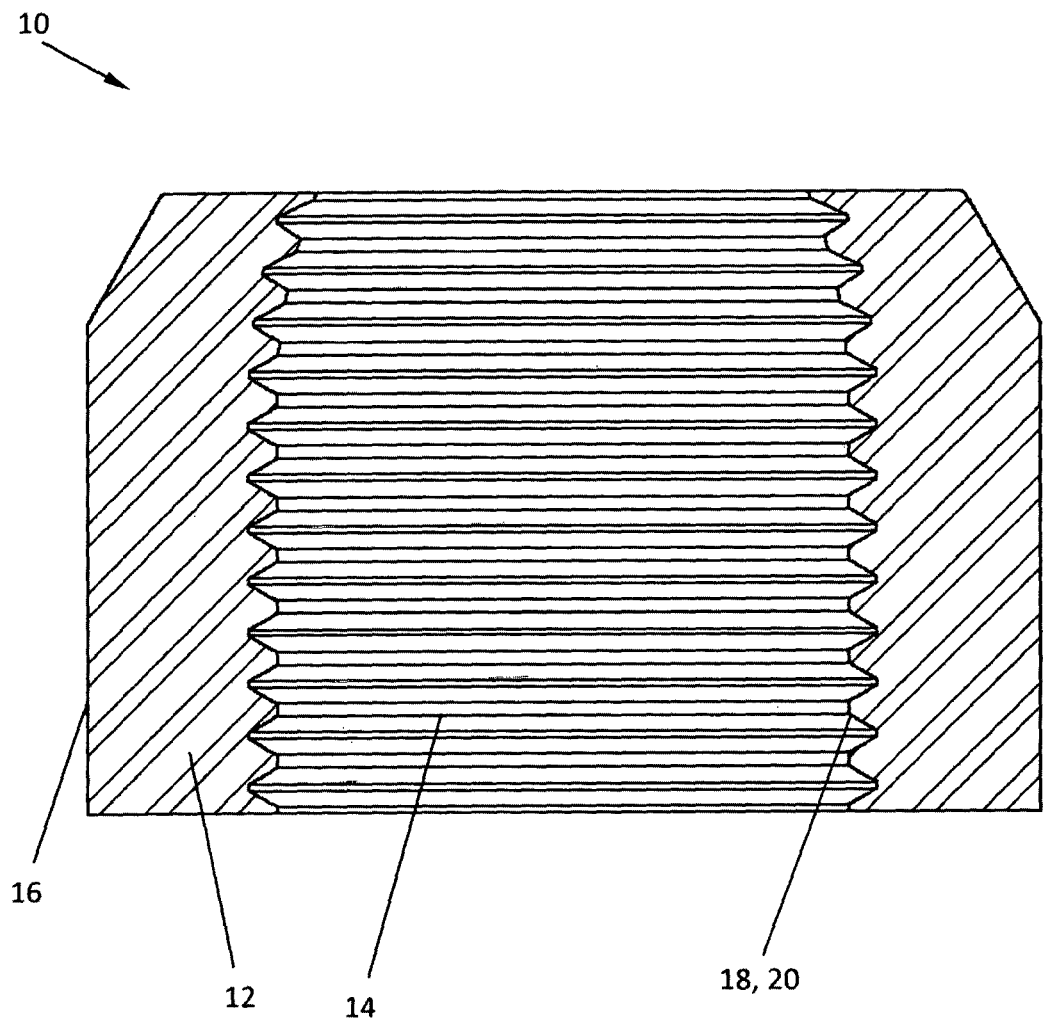

An embodiment of the presently disclosed prevailing torque nut will now be described, by way of example only, with reference to the accompanying drawings, in which:

FIG. 1 is an elevational view of an embodiment of the presently disclosed prevailing torque nut; and FIG. 2 is a cross sectional view taken along line 2-2 of FIG. 1.

Referring to the drawings, there is shown an embodiment of the presently disclosed prevailing torque nut 10. The nut 10 comprises a body 12 having a longitudinal opening 14 extending therethrough. The body has a hexagonal outer surface 16 and an inner surface 18 defining the opening 14. A female thread 20 is formed on the inner surface and extends from one longitudinal end to an opposite longitudinal end of the opening 14. The thread 20 has a constant depth along its entire length, is of helical configuration along its entire length, and tapers radially inwardly in diameter at one end of the opening 14.

The thread 20 is ideally formed by machining, such as with a computer numerically controlled (CNC) lathe.

The radial tapering of the thread 20 is designed to produce a predetermined prevailing torque when a bolt is engaged with the nut. The magnitude of radial tapering required to produce a desired prevailing torque may be determined by trial and error.

The illustrated prevailing torque nut 10 advantageously may be formed entirely from metal by machining on a CNC lathe or similar, without the need for a polymer insert, which leads to a reduction in manufacturing cost. Due to the prevailing torque being generated by an accurately machined reduced diameter section of thread 20, a desired prevailing torque can be accurately and consistently achieved and the nut 10 is less likely to jam on an associated bolt.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of possible modifications include, but are not limited to:
  the opening 14 being closed at one end, the thread taper being at the closed end of the nut; and/or
  the distance between the outer 16 and inner 18 surfaces of the nut may reduce in that portion of the nut in which the thread 20 is tapered, as shown in the illustrated embodiment, or may be constant along the length of the opening 14.

The invention claimed is:

1. A prevailing torque nut comprising:
    a body having a longitudinal opening extending at least partially therethrough, the body having an outer surface and an inner surface defining the opening; and
    a female thread formed on the inner surface and extending from one longitudinal end toward an opposite longitudinal end of the opening, the thread having a constant depth along its entire length, being of helical configuration along its entire length, and tapering radially inwardly in diameter at one end of the opening.

2. A nut according to claim 1, wherein the thread is a machined thread.

3. A nut according to claim 2, wherein the thread is a computer numerically controlled (CNC) lathe machined thread.

4. A nut according to claim 1, wherein the radial tapering of the thread is adapted to produce a predetermined prevailing torque when a bolt is engaged with the nut.

5. A nut according to claim 1, wherein the distance between the outer and inner surfaces of the nut is constant along the entire length of the opening.

6. A nut according to claim 1, wherein the distance between the outer and inner surfaces of the nut reduces in that portion of the nut in which the thread is tapered.

7. A nut according to any claim 1, wherein the nut is a multi-sided nut.

8. A nut according to claim 1, wherein the nut is a hex nut.

9. A method of manufacturing a prevailing torque nut, said method comprising forming the nut with:
    a body having a longitudinal opening extending at least partially therethrough, the body having an outer surface and an inner surface defining the opening; and
    a female thread on the inner surface extending from one longitudinal end toward an opposite longitudinal end of the opening, the thread having a constant depth along its entire length, being of helical configuration along its entire length, and tapering radially inwardly in diameter at one end of the opening.

10. A method according to claim 9, comprising forming the thread, along with the radial tapering, by machining.

11. A method according to claim 10, comprising performing the machining using a computer numerically controlled (CNC) lathe.

12. A method according to claim 9, wherein the radial tapering of the thread is adapted to produce a predetermined prevailing torque when a bolt is engaged with the nut.

13. A method according to claim 9, wherein the distance between the outer and inner surfaces of the nut is constant along the entire length of the opening.

14. A method according to claim 9, wherein the distance between the outer and inner surfaces of the nut reduces in that portion of the nut in which the thread is tapered.

15. A method according to claim 9, wherein the nut is a multi-sided nut.

16. A method according to claim 9, wherein the nut is a hex nut.

17. A prevailing torque nut manufactured by the method of claim 9.

* * * * *